United States Patent [19]

Neuhaus

[11] Patent Number: 5,048,339

[45] Date of Patent: * Sep. 17, 1991

[54] ACCELERATION PICK-UP DEVICE

[75] Inventor: Dietmar Neuhaus, Duesseldorf, Fed. Rep. of Germany

[73] Assignee: Deutsche Forschungsanstalt fur Luft- und Raumfaht eV, Cologne, Fed. Rep. of Germany

[*] Notice: The portion of the term of this patent subsequent to Sep. 17, 2008 has been disclaimed.

[21] Appl. No.: 420,554

[22] Filed: Oct. 11, 1989

[30] Foreign Application Priority Data

Oct. 11, 1988 [DE] Fed. Rep. of Germany ....... 3834531

[51] Int. Cl.⁵ .................. G01P 15/13; G01V 7/00
[52] U.S. Cl. ................................ 73/515; 73/1 D; 73/654
[58] Field of Search ..... 73/1 D, 1 DV, 515, 516 LM, 73/516 R, 517 B, 517 R, 651, 654

[56] References Cited

U.S. PATENT DOCUMENTS 4,283,952 8/1981 Newman ........................ 73/579
4,599,896 7/1986 Stewart .......................... 73/382 R
4,638,669 1/1987 Chou ............................. 73/517 R

FOREIGN PATENT DOCUMENTS 188047 11/1966 U.S.S.R. ........................... 73/651

Primary Examiner—Hezron E. Williams
Assistant Examiner—Craig Miller
Attorney, Agent, or Firm—Spensley Horn Jubas & Lubitz

[57] ABSTRACT

The acceleration pick-up device is provided with an elastic member to which an inert body is attached. Upon occurrence of an accelerative force, the elastic member is deformed. For measuring the absolute value of the acceleration, a calibration can be performed. In this calibration process, a measuring value of the acceleration is obtained on the basis of the deflection of the inert body. Subsequently, the inert body is loaded with a foreign medium so that its mass is changed, and then a further measuring value is obtained. In further measurement processes, the absolute acceleration value can be calculated from the differences of the masses and the measuring values.

18 Claims, 3 Drawing Sheets

ACCELERATION PICK-UP DEVICE

BACKGROUND OF THE INVENTION

1. Field of the Invention

The invention is directed to an acceleration pick-up device.

2. Description of Related Art

In known acceleration pick-up devices, the accelerative force acting on an inert body is monitored and measured. The inert body is maintained in its position of rest by an elastic member while the accelerative force, acting on the inert body, tends to move it out of its position of rest. Normally, this principle is not sufficient for precise measurements of acceleration values associated with very low oscillations or even constant acceleration. In navigation technique, particularly in space missions, it is desired that very low acceleration values are detected exactly and in the manner of absolute values. In this respect, a particular difficulty consists in that the measuring values of a calibrated acceleration pick-up device are valid for a limited time period only since the individual components of the measuring chain effect a drift. The spring constant of the elastic member can be considered as known so that the slope of the straight line indicating the ratio between the values of the measuring signal and of the existing acceleration is also known. The origin of the respective system of coordinates, however, is unknown. For calibrating the acceleration pick-up device, it would be suitable to know the absolute value of the acceleration of a pair of values consisting of the measured acceleration and the indicated value. Knowing said absolute value, however, requires a second acceleration pick-up device which is calibrated.

It is an object of the present invention to provide an acceleration pick-up device for measuring absolute values of acceleration which can be calibrated in a simple manner.

SUMMARY OF THE INVENTION

In the acceleration pick-up device according to the present invention, the mass of the inert body is variable in a defined manner. With a first mass value, a first measurement can be performed, and with a second mass value, a second measurement can be performed. The difference $\Delta m$ between the mass values corresponds to a difference $\Delta x$ between the deflections of the inert body upon the two measurements. The required acceleration b can be determined according to the equation $$\Delta m \times b = k \times \Delta x$$

if the force-constant k of the elastic system is known, the precondition being that the mass difference $\Delta m$ of the inert body has a defined value and that the difference $\Delta x$ of the deflection movements of the inert body is measured for the different masses. The acceleration b is proportional to the quotient $\Delta x : \Delta m$. In this manner, it is possible to calibrate the acceleration pick-up device by measuring the deflection x for two different masses. It is useful that the first measurement is performed with the inert body alone and the other measurement is performed when the inert body has been loaded with a predetermined mass of the foreign medium.

The acceleration pick-up device of the invention is suited for high-precision measurement of static and low-frequency acceleration values. The device can be applied particularly in space missions but can also be used for seismic measurements and the like. After measuring the ratio $\Delta x : \Delta m$, subsequent acceleration measurements can be performed either with the mass of the inert body alone or with the mass of the inert body having added thereto the defined mass of the foreign medium.

According to a preferred embodiment of the invention, the foreign medium is introduced into a closed housing wherein the inert body is arranged. During this process, the inert body is loaded with the preferably gaseous foreign medium. The loading of the inert body is a function of the partial pressure of the foreign medium prevailing in the housing and of the temperature. From the phase diagram, the increase of the weight of the inert body can be detected.

The inert body can consist of a metal, e.g. of vanadium which provides a good store for a gas such as hydrogen, for instance. Vanadium has a low specific weight and is capable of storing hydrogen in the interstices of the crystalline grid. Also elements other than vanadium are suited as gas stores, e.g. palladium. Further, loading does not necessarily have to be effected by hydrogen. Also deuterium can be used for this purpose.

Apart from changing the mass by gas-loading, a changing of the mass can also be obtained by condensation of a substance at the surface of the inert body or by vapor-deposition.

The changing of the mass is effected with time constants in the range of seconds, so that the acceleration pick-up device is particularly suited for determining low-frequency or even static acceleration values.

Deflection of the inert body is performed in a contactless manner. In doing so, different methods can be applied, e.g. using optical or capacitive distance-measuring devices. According to a preferred embodiment, distance-measuring is accomplished by follow-up of a pointed tip maintaining a particular distance to the inert body, a tunnel current flowing between said tip and the inert body. The mutual distance of the tip and the inert body is controllable in such a manner that the tunnel current remains constant. A piezoelectric crystal can be suitably used as a device for moving the tip.

BRIEF DESCRIPTION OF THE DRAWINGS

Preferred embodiments of the invention will be described hereunder in greater detail with reference to the drawings.

In the drawings—

DESCRIPTION OF THE PREFERRED EMBODIMENTS

Figure 1:
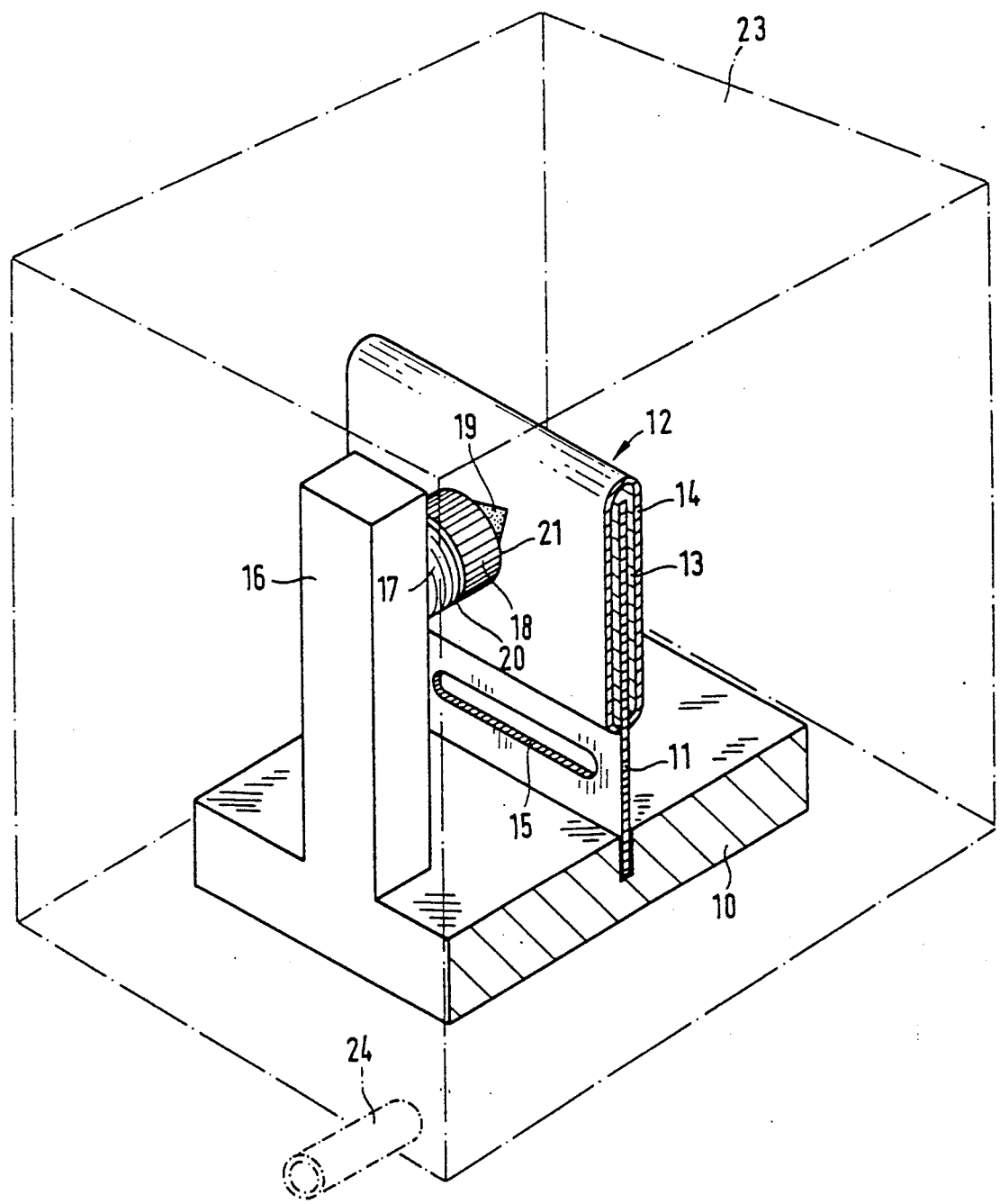
FIG. 1 is a schematic view of the mechanical arrangement of a preferred embodiment of the acceleration pick-up device.

According to FIG. 1, the acceleration pick-up device is provided with a base 10 having one end of the elastic member 11 fastened thereto. The elastic member 11 consists of a thin silicone plate. Silicone is particularly adapted to be used as an elastic member because it has a well-defined and known spring constant and can be manufactured in the desired dimensions with extreme precision, e.g. by etching.

The inert body 12, having a certain mass inertia, is fastened to the upper end of the elastic member 11. This inert body 12 consists of a body 13 of vanadium and a coating 14 of palladium surrounding said body 13. Characteristically, vanadium is a good hydrogen store, and palladium is highly permeable for hydrogen and, in the present case, serves as a surface coating for generating the required surface quality of the inert body 12.

The plate-shape of the elastic member 11 has been chosen in order to allow the acceleration pick-up device to selectively detect the acceleration component in a very specific, predetermined direction in space. This acceleration component extends rectangular to the plane of the elastic element 11 which is arranged as a bending structure. For obtaining a desired spring constant, the plate of the elastic member 11 can have cutout portions 15 in the area between the clamping attachment at base 10 and the mass 12.

The base 10 has an upright post 16 projecting therefrom, to which, beyond an interposed insulator 17, there is connected a moving means 18 for a pointed tip 19. The moving means 18 consists of piezoelectric crystal having electrodes 20, 21 arranged at the opposed end faces thereof. Connection of the tip 19 to the electrode 21, with an insulator 22 connected therebetween, is provided in such a manner that the tip 19 is directed to the lateral face of the inert body 12.

When an accelerative force, directed laterally to the surface of the elastic member 11, is exerted on the inert body 12, the elastic member 11 acts as a bending structure, i.e. it undergoes a bending movement such that the inert body 12 is moved either in the direction of tip 19 or away therefrom. The acceleration pick-up device has a high directional selectivity. For determining the acceleration values in the two other directions in space, similar acceleration pick-up devices can be used, respectively, having their elastic members arranged at right angles to the elastic member 11.

The whole of the acceleration pick-up device is arranged in a pressure-tight housing 23, with a tube 24, being connected to a hydrogen source, opening into this housing 23.

Figure 2:
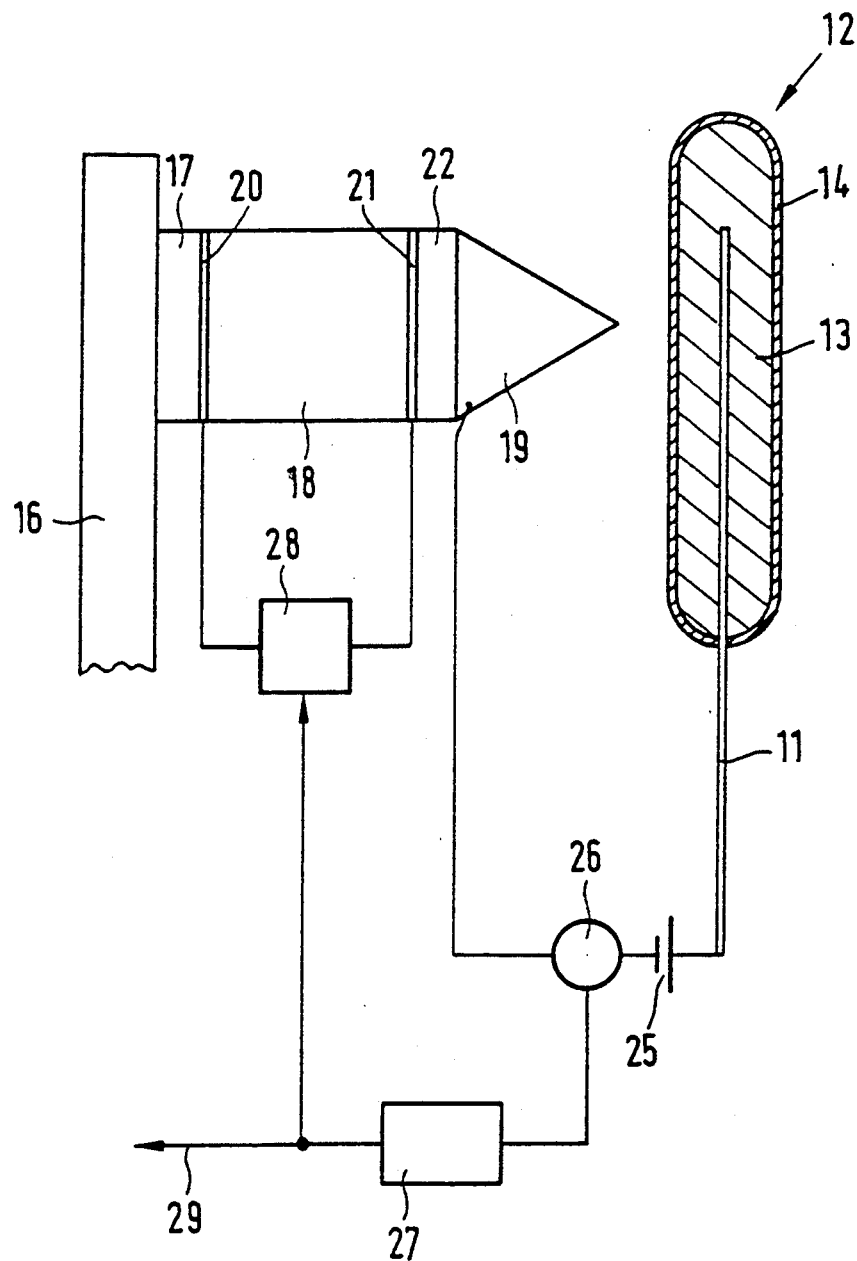
FIG. 2 is a control-circuit diagram of the sensor.

The functional principle of the acceleration pick-up device will be explained below with respect to FIG. 2: The tip 19 is a small distance from the inert body 12. This distance amounts to some $10^{-10}$ m. A current source 25, by one of its poles, is connected to the elastic element 11 and is connected, via this elastic element, to the electrically conductive inert body 12. The other pole of current source 25 is connected, via an Amperemeter 26, to the tip 19 which is also electrically conductive. The current source 25, having a voltage of 6 V, generates a tunnel current between the tip 19 and the inert body 12, the strength of which tunnel current is measured by the Amperemeter 26. The output signal of the Amperemeter 26 is supplied to a control device 27 which controls a high-voltage source 28. The output lines of the high-voltage source 28 are connected to the electrodes 20 and 21 to both sides of the moving means 18. Since this moving means 18 consists of piezoelectric crystal, its position varies in dependence of the value of the high voltage applied to its ends. The control device 27 varies the length of the moving means 18 in such a manner that the tunnel current between the tip 19 and the inert body 12 remains constant. Thereby, also the distance between the tip 19 and the inert body 12 remains constant, i.e. the tip 19 follows the movement of the inert body 12 at a constant distance. The output signal 29 of the control device 27 is the measuring signal which is proportional to the deflection of the inert body 12 from its position of rest.

In order to calibrate the acceleration pick-up device, a first measurement is performed while an initially unknown accelerative force acts on the inert body 12, an output signal being received at the output line 29. For carrying out this measurement, it is provided that the hydrogen partial-pressure in the housing 23 is low. To this purpose, the hydrogen pressure in housing 23 is decreased. Then, hydrogen is introduced into housing 23 through inlet 24 until a specific partial pressure of the hydrogen has been built up in housing 23. During this process, the vanadium body 13 is loaded with hydrogen, permeating through the palladium coating 14 so that the mass of the inert body 12 is increased by a precisely defined amount $\Delta m$. Then, with the same acceleration still existing, a second measurement due to the increased mass of the inert body 12, the deflection of the inert body 12 from its position of rest is larger than upon the first measurement. Thus, the signal at output line 29 is increased as well. By the two measurements, performed for different masses, and the thus obtained different signals at output line 29, the proportionality between the output signal and the mass is detected, and, therefore, the proportionality between the output signal and the absolute acceleration is calculated. In this manner, calibration of the acceleration pick-up device has been accomplished.

Subsequent to the calibration, acceleration measurements may be carried out over a comparatively long time period, either the increased mass of the inert body 12 being used or, prior to measurement, discharge of hydrogen from the inert body 12 being effected. The fact that hydrogen can be discharged from the inert body 12 allows calibrating cycles to be performed at any desired number of times.

Figure 3:
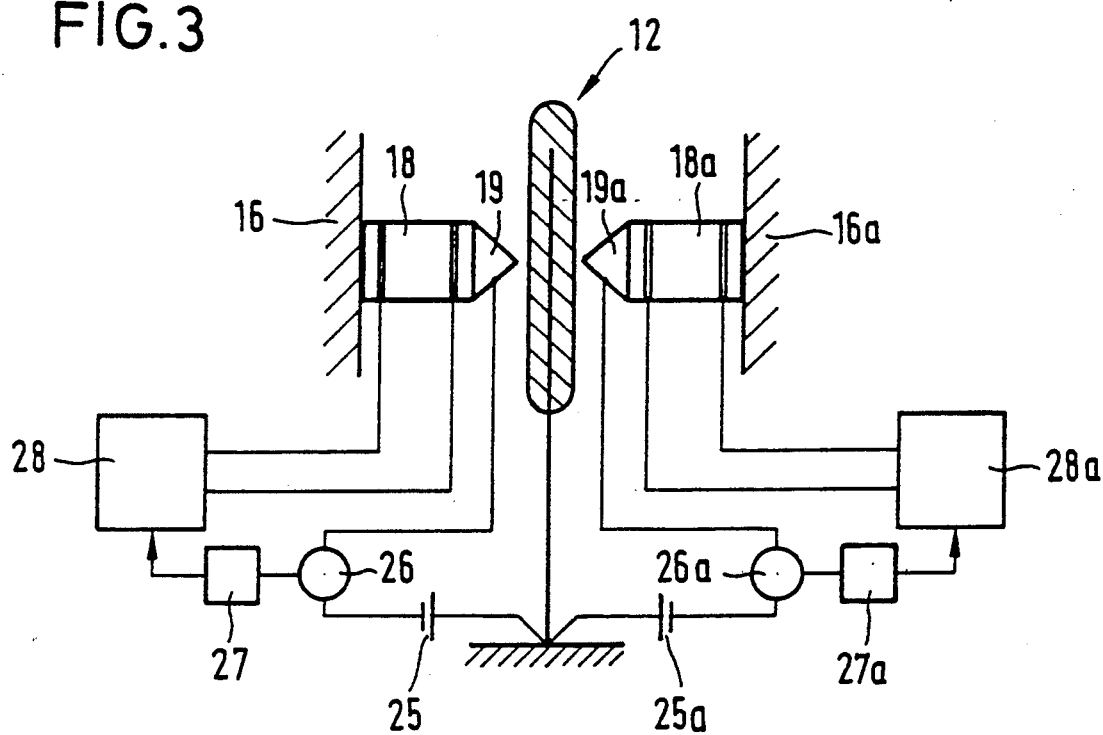
FIG. 3 shows an embodiment having sensors arranged on both sides of the inert body, for compensation of such changes of the tunnel current which are caused by the loading of the inert body.

In the embodiment of FIG. 3, it is provided that, in addition to the sensor described above, having its tip 19 arranged on one side of the inert body 12, another sensor is arranged on the opposite side. The components of said other sensor correspond to those of the first sensor and are marked by the same reference numerals, having the letter "a" added thereto, respectively. When the inert body 12 is deflected, out of its position of rest, towards one side, the one moving means 18 or 18a, respectively, is shortened whereas the opposite moving means is extended. The variant of FIG. 3 is suitable in those cases in which the tunnel current between tip 19 and inert body 12 is varied alone by the changed gas pressure, or in the case where this tunnel current is changed by contaminations at the surface of the inert body 12. The two control devices 27 and 27a are connected to each other in such a manner that their output signals are substracted. Normally, the output signals of the control devices 27 and 27a are identical in their values and different in their sign so that the substraction result of these output signals is zero when the inert body 12 is in its central position. However, the difference of the output signals of the control devices 27 deviates from zero when the inert body 12 is in a deflected condition. Thus, this difference is used as the measuring signal.

In the above embodiments, the inert body, supported by the elastic member, is freely movable. It is also possible to provide an embodiment wherein a reset means acts on the inert body in such a manner that the inert body, in case of all possible accelerative forces to which it is subjected, is maintained in the same position. In such an embodiment, acceleration measurement can be performed using that force which is required for the reset means for holding the inert body in its predetermined position. In this case, the sensor is used for controlling the force of the reset means.

Figure 4:
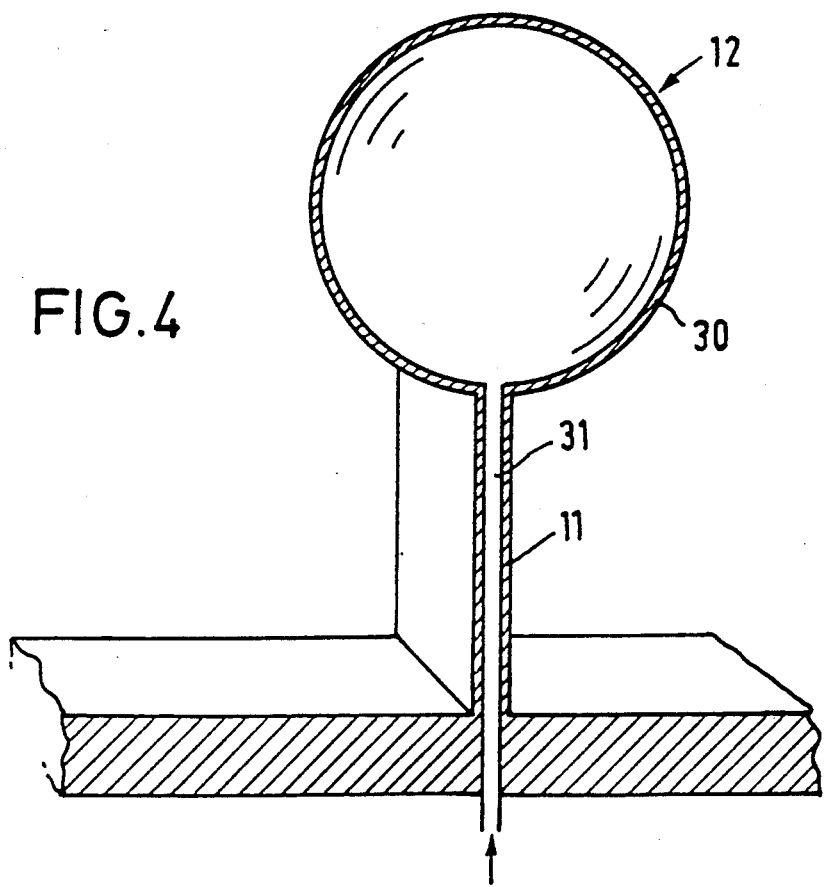
FIG. 4 shows an embodiment provided with a hollow body.

In the embodiment of FIG. 4, the inert body 12 is a hollow body 30, preferably shaped as a ball. The hollow body 30 has a conduit 31 leading thereinto which passes through the elastic member 11 and through which a fluid, preferably a gas, can be introduced into the hollow body 30. Suitable fluids are particularly xenon or $SF_6$ (sulphur hexafluoride). By gas being introduced into the hollow body 30, the mass of hollow body 30 is changed so that also the force necessitated for a specific deformation of the elastic member 11 is changed. Outside the hollow body 30, there exists an atmosphere of a gas having a density which is different from that of the gas within the hollow body 30. The pressure values outside and within the hollow body are preferably equal. By introducing gas into the hollow body 30 and evacuating the hollow body, the mass of the hollow body 12 is changed.

I claim:

1. An acceleration pick-up device having a body which is fastened to an elastic member, and a sensor for detecting the position of said inert body, characterized in that, for calibrating an absolute value of acceleration, the mass of the inert body is controllably changed by the addition or the receiving of a foreign medium, wherein the inert body, together with the elastic member and the sensor, is accommodated in a pressure-tight housing and wherein the foreign medium is introduced into said housing.

2. An acceleration pick-up device having a body which is fastened to an elastic member, and a sensor for detecting the position of said inert body, characterized in that, for calibrating an absolute value of acceleration, the mass of the inert body is controllably changed by the addition or the receiving of a foreign medium, wherein the inert body consist of a gas-absorbing material and the foreign medium is a gas.

3. An acceleration pick-up device having a body which is fastened to an elastic member, and a sensor for detecting the position of said inert body, characterized in that, for calibrating an absolute value of acceleration, the mass of the inert body is controllably changed by the addition or the receiving of a foreign medium, wherein the inert body, together with the elastic member and the sensor, is accommodated in a pressure-tight housing and wherein the housing is connected to a vaporization means for vapor-deposition of a foreign medium onto the inert body.

4. An acceleration pick-up device having a body which is fastened to an elastic member, and a sensor for detecting the position of said inert body, characterized in that, for calibrating an absolute value of acceleration, the mass of the inert body is controllably changed by the addition or the receiving of a foreign medium, wherein the inert body contains a body consisting of vanadium.

5. The acceleration pick-up device according to claim 4, wherein the inert body is provided with a coating consisting of palladium.

6. The acceleration pick-up device according to a claim 1, wherein the sensor is provided with a pointed tip which is directed towards the inert body and has a tunnel current flowing therethrough to the inert body, wherein the pointed tip is movable in the direction of the inert body, and a moving means for moving the pointed tip is controlled in such a manner that the distance between the pointed tip and the inert body remains constant.

7. The acceleration pick-up device according to claim 1, wherein a sensor is arranged on each side of the inert body and wherein the measuring signal is derived from the difference of the output signals of said two sensors.

8. An acceleration pick-up device having a body which is fastened to an elastic member, and a sensor for detecting the position of said inert body, characterized in that, for calibrating an absolute value of acceleration, the mass of the inert body is controllably changed by the addition or the receiving of a foreign medium, wherein the inert body is a hollow body the mass of which is variable by introducing a fluid.

9. The acceleration pick-up device according to claim 8, wherein the fluid is introduced to the interior of the hollow body and wherein outside the hollow body, there exists an atmosphere of a gas having a density being different from that of the fluid and having a pressure being equal to that of the fluid.

10. A device according to claim 1, further comprising:
a housing for accommodating the inert body, the elastic member and the sensor, and
means for introducing the foreign medium into the housing.

11. An acceleration pick-up device for determining acceleration values, comprising:
an elastic member,
a body fastened to the elastic member,
a sensor for detecting the position of the inert body,
means for adding a foreign medium to the inert body to thereby change the mass of the inert body for calibration, whereby an absolute value of acceleration is determined, and
wherein the inert body comprises a gas-absorbing material and the foreign medium comprises a gas.

12. An acceleration pick-up device for determining acceleration values, comprising:
an elastic member,
a body fastened to the elastic member,
a sensor for detecting the position of the inert body,
means for adding a foreign medium to the inert body to thereby change the mass of the inert body for calibration, whereby an absolute value of acceleration is determined, and further comprising:
a housing for accommodating the inert body, the elastic member and the sensor, and
vaporization means for vapor-deposition of the foreign medium onto the inert body.

13. An acceleration pick-up device for determining acceleration values, comprising:
an elastic member,
a body fastened to the elastic member,
a sensor for detecting the position of the inert body,
means for adding a foreign medium to the inert body to thereby change the mass of the inert body for calibration, whereby an absolute value of acceleration is determined, and wherein the inert body comprises vanadium.

14. A device according to claim 13, wherein the inert body is provided with a coating of palladium.

15. A device according to claim 11, wherein the sensor comprises:
- a substantially pointed tip directed toward the inert body,
- means for establishing a tunnel current between the tip and the inert body,
- means for moving the tip relative to the inert body, and means for maintaining a substantially constant distance between the tip and the inert body.

16. A device according to claim 11, further comprising
- at least two sensors for detecting the position of the inert body and for generating an output signal in response thereto, the two sensors being arranged on opposite sides of the inert body, and
- means for measuring a difference between the output signals generated by the two sensors and deriving a measuring signal in response thereto.

17. An acceleration pick-up device for determining acceleration values, comprising:
- an elastic member,
- a body fastened to the elastic member,
- a sensor for detecting the position of the inert body,
- means for adding a foreign medium to the inert body to thereby change the mass of the inert body for calibration, whereby the absolute value of acceleration is determined, and wherein an inert body comprises a hollow body and the foreign medium comprises a fluid.

18. A device according to claim 17, wherein the fluid is added to the interior of the hollow body and the fluid has a density and a pressure and the hollow body is surrounded by a gas having a density different from that of the fluid and having a pressure equal to that of the fluid.

* * * * *